3,439,683
AXIAL FLOW COMBINE
Arthur H. Keller, Western Springs, Ill., assignor to International Harvester Company, Chicago, Ill., a corporation of Delaware
Filed Dec. 15, 1966, Ser. No. 602,046
Int. Cl. A01f 12/20; A01d 41/04
U.S. Cl. 130—27                                       8 Claims

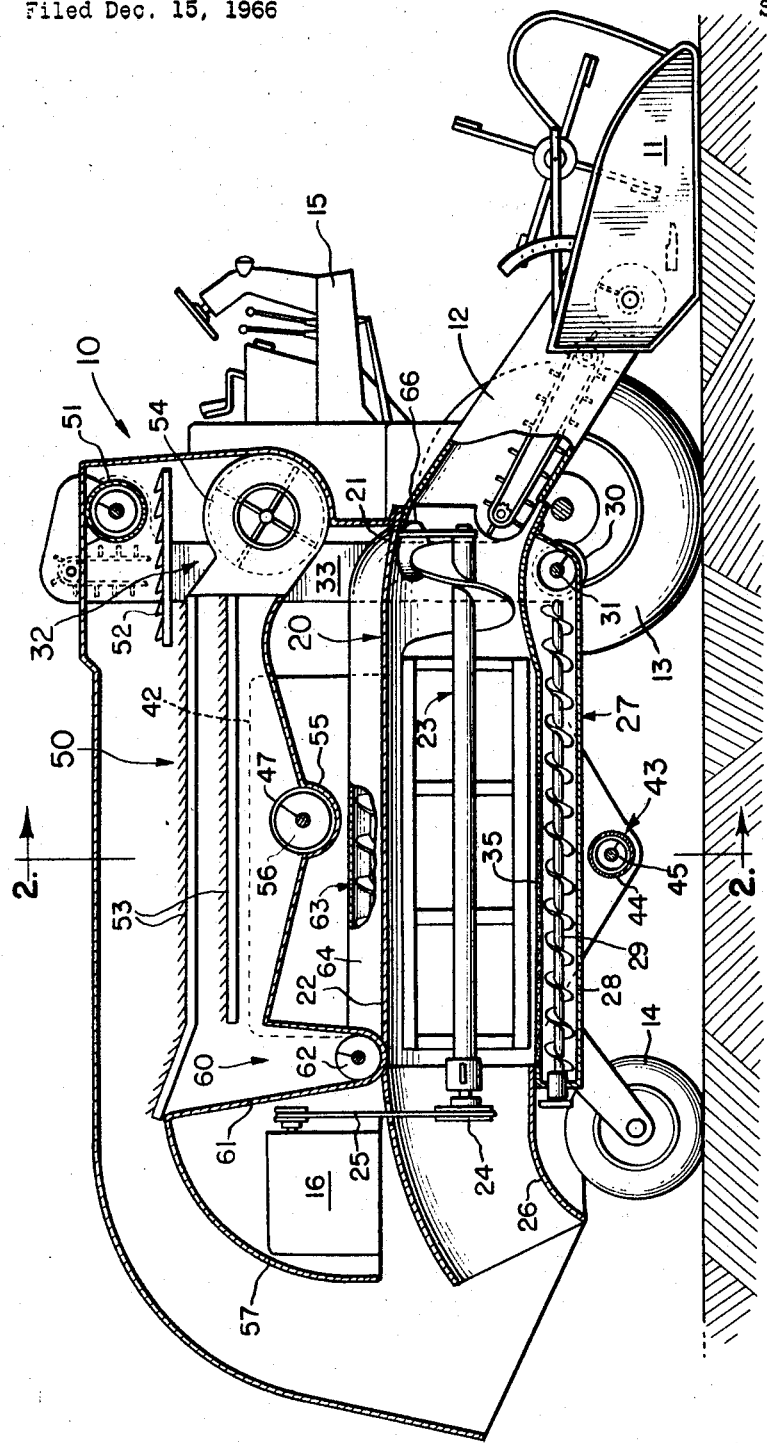

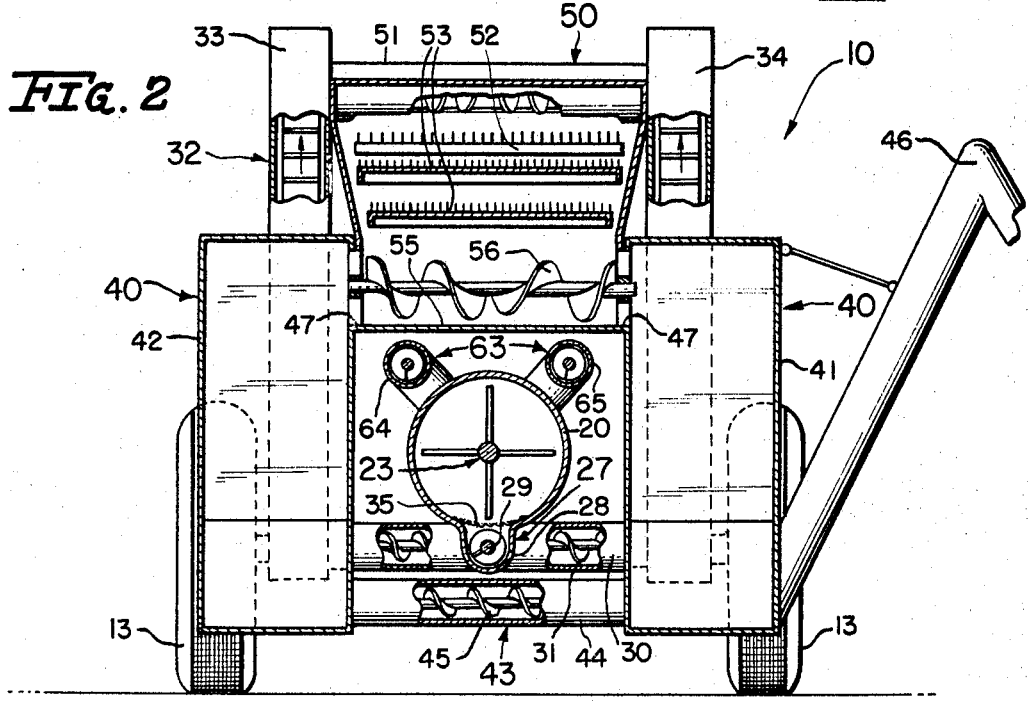
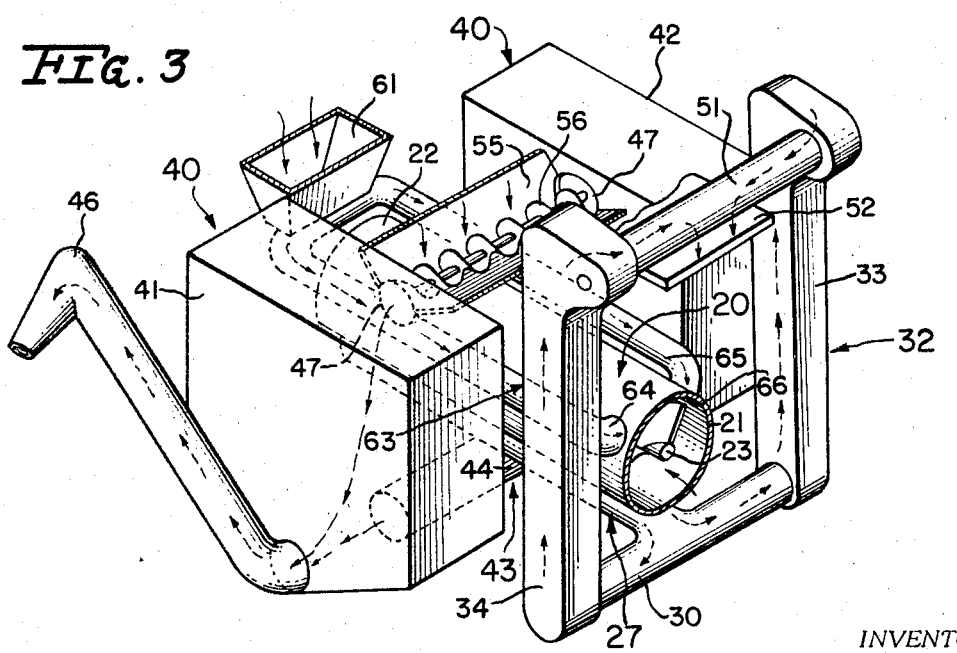

ABSTRACT OF THE DISCLOSURE

A harvesting machine in which the separator and cleaning mechanism are located above the elongated threshing cylinder and a grain storage tank is located along each side of the threshing cylinder. This geographic location of the components provides for a low center of gravity and thus a stable harvesting machine.

---

The present invention relates generally to improvements in rotary or axially flow type combines and the like and more particularly to a new arrangement for the cleaning system in combination with grain storage tanks on an axially flow type combine.

In an axially flow type combine the threshing and separating unit on the combine have a generally cylindrical shape as compared to the rectangular shape of the threshing and separating unit of a conventional combine. Also in the axially flow type combine the drive to the rotor and material handling means can be located at one end of the cylindrically shaped unit as compared to a conventional combine in which the drive for the cylinder, the straw walkers and other material handling means must all be located along the longitudinally extending side walls of the threshing and separating units. Thus these longitudinally extending side walls must remain accessible for servicing of the drives. In the axially flow type combine it is not necessary that the sides of the cylindrically shaped unit be accessible for this purpose. The arrangement of the grain storage tanks and the grain cleaning unit in relation to this cylindrically shaped threshing and cleaning unit constitutes the inventive concept of this application.

The threshing and separating section of the axially flow combine is much heavier than is a conventional cleaning unit of the type disclosed in this application and thus by locating the cleaning system above the threshing and separating section rather than below the center of gravity of the machine is lowered and the machine is rendered more stable. The use of dual grain tanks also improves stability characteristics of the machine. When the grain tanks are empty the grain storage system of the combine has little effect upon the stability of the machine. As grain is collected in the grain storage tanks the initial effect is to lower the center of gravity of the combine which continues until the grain in the tanks reaches the level of the center of gravity. As the level of grain in the tanks is increased beyond this point the center of gravity will also raise but will be offset by the grain contained in the lower portion of the tanks. Thus the grain level of the tank can be limited to the point where the combine will have the same center of gravity with the tank full as it did with the tank empty.

An object of the present invention is the provision of an axially flow type combine having a grain cleaning and grain storage system arranged such that the combine has a low center of gravity.

Another object is to provide an axially flow type combine in which the threshing, separating, cleaning, tailings return and grain storage systems are all arranged relative to each other to provide a compact combine having a low center of gravity.

A further object of the invention is the provision of an axially flow type combine including dual grain tanks located on each side of the cylindrically shaped threshing and separating cylinder.

These and other objects of the invention will become more apparent from the specification and drawings, wherein:

FIGURE 1 is a cross-sectional side view of an axially flow type combine including the subject invention;

FIGURE 2 is a sectional view of the axially flow type combine taken along lines 2—2 of FIGURE 1; and FIGURE 3 is a schematic view of the material flow path through the threshing, separating, tailings return, cleaning and grain storage systems of the subject axially flow type machine.

Referring now to the drawings wherein like reference characters designate like or corresponding parts throughout the several views there is shown in FIGURE 1 an axially flow type combine generally designated 10 including a header 11, a feeder 12, drive wheels 13, steerable sheels 14, an operator's platform 15 and an engine 16. The other major components of the combine include the cylindrically shaped threshing and separating unit 20, a pair of grain storage tanks 40 and a grain cleaning unit 50.

As the combine 10 is driven through a field the header 11 functions to sever the crop, gather it and deliver it to the feeder 12. The feeder 12 functions to elevate and deliver the crop rearwardly into the front end 21 of the cylindrically shaped threshing and separating unit 20.

The cylindrically shaped threshing and separating unit has a front end 21 and a rear end 22 and extends generally along the longitudinal axis of the combine. A rotor 23 is mounted within the unit 20 and includes a drive means such as a pulley 24 driven by a belt 25 from the engine 16. A straw discharge spout 26 is located rearwardly of the cylindrically shaped threshing and separating unit 20. A grain collecting means 27 extends the entire length of the unit 20 and is made up of a longitudinally extending trough 28 having an auger 29 mounted therein that receives the grain from the unit 20 and conveys it forwardly into a transversely extending trough 30. The transversely extending trough 30 has an auger 31 mounted therein with the flighting extending in opposite directions from the center. The auger 31 functions to divide the grain received from the auger 29 and to convey half of it in each direction. The auger 31 deposits the grain into an elevator 32 having a first branch 33 and a second branch 34. The first and second branches of the elevator 32 straddle the cylindrically shaped threshing and separating unit 20 and deposit the grain into the distributing means 51 of the grain cleaning unit 50. It should be understood, of course, that the elevator 32 could also be constructed to have only one branch.

The cylindrically shaped threshing and separating unit 20 receives the unthreshed material at its front end 21 and moves it axially through the unit towards the rear end 22. As the unthreshed material proceeds through the unit 20 the threshed grain passes through a grate 35 located in the bottom of the unit and is collected in the trough 28. The straw and other trash that is not collected in the trough 28 is discharged through the straw discharge spout 26 located at the rear of the cylindrically shaped unit 20. The operation of the threshing and separating unit is not important to the understanding of the inventive concept disclosed in this application and thus the above is considered an adequate disclosure of this unit. Reference may be made to the Schlayer Patent No. 1,688,662 of Oct. 23, 1968, for a disclosure of an axially flow type thresher and separating unit.

The grain cleaning unit 50 is located above the cylindrically shaped threshing and separating unit 20 along the longitudinal center of the combine. As previously stated the distributing means 51 receives the grain from the first and second branches 33 and 34, respectively, of the elevator 32 and deposits it on the grain pan 52 of the cleaning unit. The cleaning unit 50 is of conventional design and includes a grain pan 52; cleaning sieves 53, a fan 54 and a clean grain collecting trough 55. A conveyor 56 such as an auger having flightings extending in opposite directions from its center is located in the clean grain collecting trough 55. As shall be described in more detail the conveyor 56 divides the clean grain received from the grain cleaning unit 50 and deposits half of it into each of the grain storage tanks 40.

A tailings collecting means is located at the rear end of the grain cleaning unit and includes a transversely extending trough 61 having a conveying auger 62 located in its bottom that functions to divide the tailings and feed them in both directions. The tailings return conveyor 63 includes a first and second branch 64 and 65 respectively in the form of tubes having augers or the like mounted therein that connect with openings 66 formed in the front end 21 of the cylindrically shaped threshing and separating unit. Thus any material that has been fed to the grain cleaning unit and has passed through the cleaning sieves 53 that was not fed to the clean grain collecting trough 55 will be redeposited in the front end of the cylindrically shaped threshing and separating unit and processed again. Any material that was sent to the grain cleaning unit 50 that does not pass through the cleaning sieves 53 will be discharged through the straw discharge chute 57.

The pair of grain storage tanks 40 include a first tank 41 and a second tank 42. The tanks 41 and 42 are located on opposite sides of the cylindrically shaped threshing and separating unit and extend in a direction generally parallel to the longitudinal axis of the combine. Openings 47 are formed in the inner walls of the first and second grain tanks in registry with the clean grain collecting trough 55. The conveying means 56 contained in the trough 55 feeds grain through the openings 47 into the grain tanks 41 and 42. A grain transfer means 43 is located at the bottom of the grain tanks and includes a conduit 44 connecting the bottom of the two tanks. The conduit 44 extends below the cylindrically shaped threshing and separating unit 20. An auger 45 is journalled within the conduit 44 and has portions extending into both tanks 41 and 42. The flighting of auger 45 extends in only one direction and thus upon rotation will convey grain from one tank through the conduit 44 into the bottom of the other tank. As seen in FIGURE 2 auger 45 will convey grain from tank 42 through the conduit 44 into the tank 41. A grain discharge means 46 is extended upwardly and outwardly from grain tank 41 through which both tanks can be unloaded.

*Operation*

As the combine is driven through the field the crop is cut and gathered by the header 11 and fed through the feeder 12 into the front end of the cylindrically shaped threshing and separating unit 20. As the material proceeds axially through the cylindrically shaped threshing and separating unit 20 the threshed grain is collected in the trough 28 and the straw is discharged through the straw discharged spout 26. The threshed grain is fed forwardly through the trough 28 and transversely through the trough 30 where it is deposited into the elevator 32. The elevator 32 raises the grain through the first and second branches 33 and 34 and deposits it into the distributing means 51 of the grain cleaning unit 50. The grain is worked toward the rear of the machine through the grain cleaning unit 50 and a stream of air produced by the fan 54 carries away the chaff and dust that is discharged through the straw discharge chute 57. The clean grain is collected in the clean grain collecting trough 55 from which it is fed to the pair of grain storage tanks 40.

At the rear end of the grain cleaning unit there is a tailings collecting means 60 which collects the material that is not carried away by the fan 54 or collected as clean grain. This material is fed forwardly of the combine through the tailings return conveyor 63 and fed through openings 66 into the front of the cylindrically shaped unit 66 for reprocessing.

The clean grain collected in the trough 55 is fed by an auger 56 through the openings 47 in the first and second grain tanks 41 and 42. Grain from tank 42 can be fed through conduit 44 into tank 42. A grain discharge means 46 is located in the bottom of tank 41 by which the grain from both tanks can be unloaded and deposited into a trailing wagon or the like.

It should be understood of course that the foregoing disclosure relates to only a preferred embodiment of the invention and that numerous modifications and alterations may be made therein without departing from the spirit and scope of the invention as set forth in the appended claims.

What is claimed is:

1. In a combine of the type having a cylindrically shaped threshing and separating unit in which material to be threshed flows axially from the front of said cylindrically shaped unit toward its rear wherein the improvement comprises: a pair of grain storage tanks, one located on each side of said cylindrically shaped unit; a grain cleaning unit located above said cylindrically shaped unit, the direction of material flow in said grain cleaning unit being the same as in said cylindrically shaped unit; said cylindrically shaped unit including a grain collecting means that accumulates the uncleaned grain and conveys it to the front of said unit; an elevator arranged to receive the unclean grain from said grain collecting means and deliver it to the grain cleaning unit; said grain cleaning unit including a clean grain collecting trough arranged transversely of said cylindrically shaped unit and connecting the upper portions of said pair of grain tanks, conveying means in said clean grain collecting trough for feeding the clean grain into said pair of grain tanks, said grain cleaning unit also including tailings collecting means having tailings return conveyor located above said cylindrically shaped unit offset transversely from its center and below said grain cleaning unit and extending from the rear to the front of said cylindrically shaped unit.

2. The invention as set forth in claim 1 wherein grain transfer means connecting the bottoms of said pair of grain storage tanks extend below and transverse to said cylindrically shaped unit, and a grain discharge means extending from one of said grain storage tanks for unloading all of the grain from said pair of tanks.

3. The invention as set forth in claim 1 wherein said elevator includes two separate branches, one on each side of said cylindrically shaped unit.

4. The invention as set forth in claim 1 wherein said tailings return conveyor includes two branches each offset from the center of said cylindrically shaped unit.

5. The invention as set forth in claim 2 wherein said elevator includes two separate branches one on each side of said cylindrically shaped unit.

6. The invention as set forth in claim 2 wherein said tailings return conveyor includes two branches each offset from the center of said cylindrically shaped unit.

7. The invention as set forth in claim 5 wherein said tailings return conveyor includes two branches each offset from the center of said cylindrically shaped unit.

8. The invention as set forth in claim 3 wherein said tailings return conveyor includes two branches each offset from the center of said cylindrically shaped unit.

References Cited

UNITED STATES PATENTS

| | | | |
|---|---|---|---|
| 3,152,702 | 10/1964 | Klemm et al. | 56—473.5 |
| 3,159,289 | 12/1964 | Tweedale | 214—17 |
| 3,245,208 | 4/1966 | Mark et al. | 56—21 |

ANTONIO F. GUIDA, *Primary Examiner.*

U.S. Cl. X.R.

56—21